(12) United States Patent
Merle (10) Patent No.: US 11,715,061 B2
(45) Date of Patent: Aug. 1, 2023

(54) INTEGRATION OF DISPARATE SHIPPING AGGREGATION, COMMERCE, AND LOCKER PLATFORMS

(71) Applicant: ShipPromo, LLC, Bloomington, MN (US)

(72) Inventor: Jeffrey Merle, Shorewood, MN (US)

(73) Assignee: ShipPromo, LLC, Bloomington, MN (US)

(*) Notice: Subject to any disclaimer, the term of this patent is extended or adjusted under 35 U.S.C. 154(b) by 303 days.

(21) Appl. No.: 16/821,777

(22) Filed: Mar. 17, 2020

(65) Prior Publication Data

US 2020/0302388 A1    Sep. 24, 2020

Related U.S. Application Data

(60) Provisional application No. 62/820,600, filed on Mar. 19, 2019.

(51) Int. Cl.
 *G06Q 10/08* (2023.01)
 *G06Q 10/0836* (2023.01)
 (Continued)

(52) U.S. Cl.
 CPC ..... *G06Q 10/0836* (2013.01); *G06Q 10/0833* (2013.01); *G06Q 10/08345* (2013.01);
 (Continued)

(58) Field of Classification Search
 CPC ............ G06Q 30/0613; G06Q 30/08; G06Q 20/0855; G06Q 10/0836; G06Q 10/0833;
 (Continued)

(56) References Cited

U.S. PATENT DOCUMENTS 8,131,651 B1 * 3/2012 Bennett ............ G06Q 10/06311
 705/333
8,688,540 B1 * 4/2014 Patel ................ G06Q 20/0855
 705/26.1
(Continued)

FOREIGN PATENT DOCUMENTS

CA    2926988 A1 *  4/2015 ............. G06F 21/62
WO  2015/057721    *  4/2015 ............. G06Q 10/08

OTHER PUBLICATIONS

Automate Shipping | Shippo. Downloaded from the Internet on Mar. 27, 2020 at https://goshippo.com/shipping/automate-shipping/.
(Continued)

*Primary Examiner* — Shannon S Campbell
*Assistant Examiner* — Freda A Nelson
(74) *Attorney, Agent, or Firm* — Forsgren Fisher; Daniel A. Tysver; James M. Urzedowski (57) ABSTRACT

A system and method are presented that utilize an unaltered application programming interface (API) provided by a shipping aggregator to provide a customer-facing aggregation service. Standard shipping aggregator APIs are unable to accept customer-specified ship-from addresses and customer-specified package details. This is especially true when using standard e-commerce platforms. Custom integration programming operates between the e-commerce platform and the unaltered shipping aggregator API in order to provide customer-facing aggregation services. Locker locations also form part of the system, allowing customer-facing aggregation using carrier agnostic lockers for ship-from and ship-to locations.

20 Claims, 6 Drawing Sheets

(51) Int. Cl.
*G06Q 10/0835* (2023.01)
*G06Q 10/0833* (2023.01)
*G06Q 10/0834* (2023.01)
*G07C 9/00* (2020.01)
*G07C 9/28* (2020.01)

(52) U.S. Cl.
CPC ... *G06Q 10/08355* (2013.01); *G07C 9/00571* (2013.01); *G07C 9/00896* (2013.01); *G07C 9/28* (2020.01); *G07C 2009/0092* (2013.01); *G07C 2009/00936* (2013.01)

(58) Field of Classification Search
CPC ......... G06Q 10/08345; G06Q 10/0835; G06Q 10/0834; G06F 16/83; G07C 9/28
USPC ........................................ 705/26.1, 26.3, 339
See application file for complete search history.

(56) References Cited

U.S. PATENT DOCUMENTS

| | | | | |
|---|---|---|---|---|
| 2008/0256562 | A1* | 10/2008 | Wenkel | G06F 16/83 |
| | | | | 707/E17.127 |
| 2015/0066678 | A1* | 3/2015 | Ogilvie | G06Q 30/08 |
| | | | | 705/26.3 |
| 2017/0061524 | A1* | 3/2017 | Williams | G06Q 30/0613 |

OTHER PUBLICATIONS

Basic Shipping API Integration | Shippo. Downloaded from the Internet on Mar. 27, 2020 at https://goshippo.com/shipping/basic-shipping-api-integration/.

Comparing Shipping Solutions | Shippo. Downloaded from the Internet on Mar. 27, 2020 at https://goshippo.com/shipping/comparing-shipping-solutions/.

Low Cost Courier and Delivery Services | Parcel Monkey. "Compare and Book Low Cost Shipping Services". Downloaded from the Internet on Mar. 27, 2020 at https://www.parcelmonkey.com/#explainer.

Software and Systems | SendPro Online Sending Solution | Pitney Bowes. Downloaded from the Internet on Mar. 27, 2020 at https://www.pitneybowes.com/us/shipping/software-and-systems/sendpro-online.html.

ShipHawk | Shipping Software for eCommerce | NetSuite and TMS. Downloaded from the Internet on Mar. 27, 2020 at https://shiphawk.com/.

Shipping Rates | ShipGooder. Downloaded from Internet on Mar. 27, 2020 at https://shipgooder.com/getting-shipping-rates/.

Shippo | WooCommerce. "Easier Shipping. Happier Customers. Less Time and Money Spent". Downloaded from the Internet on Mar. 27, 2020 at https://woocommerce.com/products/shippo/.

* cited by examiner

INTEGRATION OF DISPARATE SHIPPING AGGREGATION, COMMERCE, AND LOCKER PLATFORMS

CROSS-REFERENCE TO RELATED CASES

The present application claims benefit to U.S. Provisional Patent Application No. 62/820,600, filed on Mar. 19, 2019, which is hereby incorporated by reference in its entirety.

FIELD OF THE INVENTION

The present invention relates to the field of integration of disparate software elements. More particularly, the present invention relates to custom processes that integrate an existing shipping aggregator platform with a commerce platform and a locker platform, and the combination resulting therefrom.

DETAILED DESCRIPTION

System 10

Figure 1:
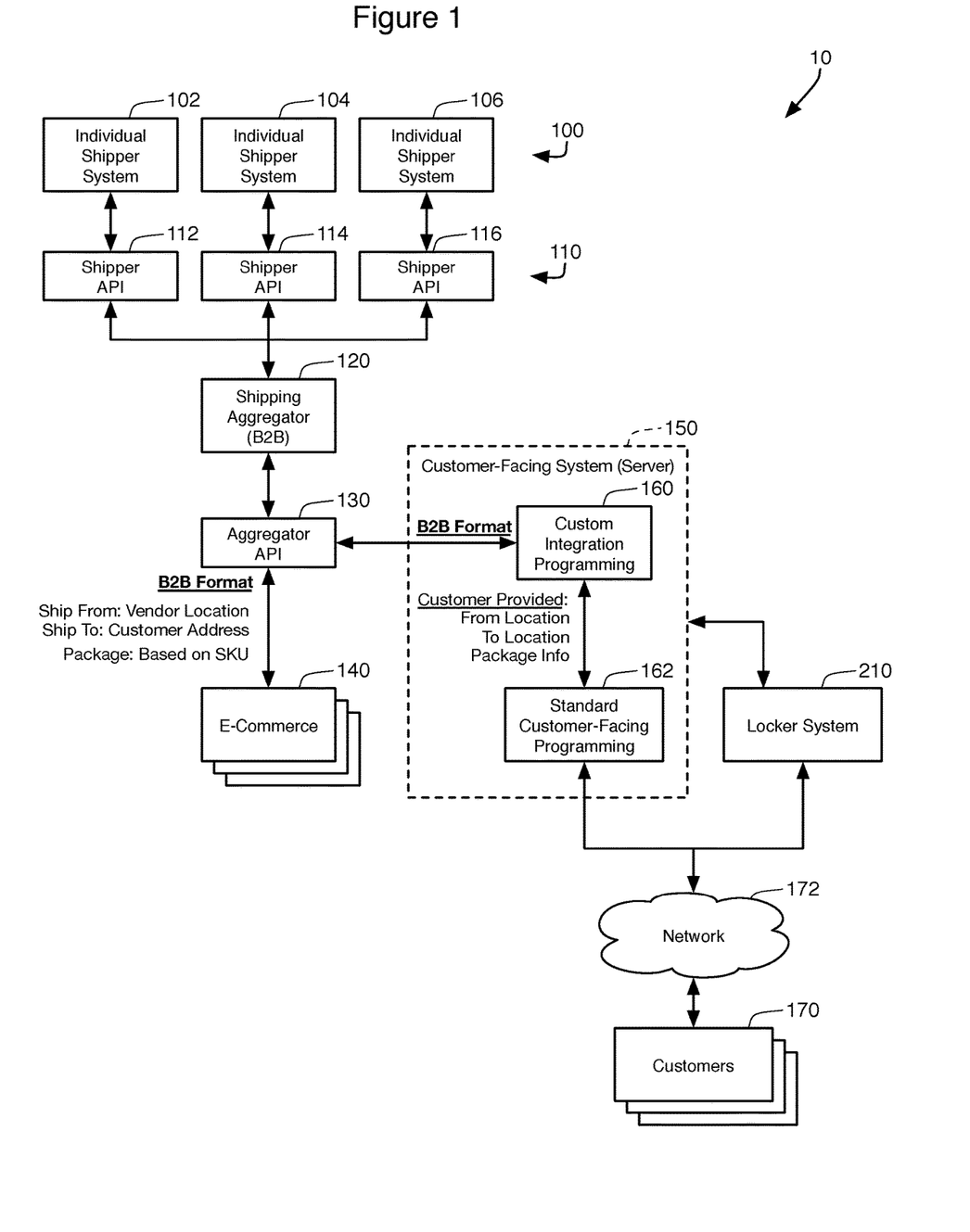
FIG. 1 is a schematic view of the primary elements of the invention.

FIG. 1 shows an overall system 10 used for integrating a customer-facing shipping system with an existing shipping aggregation system designed for business-to-business shipping services. Individual shippers or parcel carrier companies, such as the United States Postal Services (or "USPS"), FedEx Corporation (Memphis, Tenn.), and United Parcel Service (or "UPS," of Sandy Springs, Ga.) provide parcel pickup and delivery services across the United States and, in some cases, across the world. These parcel carrier companies or shippers manage complex computerized shipper systems 100 for pricing, service engagement, parcel management, logistics, and other management functions. In FIG. 1, it is shown that three separate parcel delivery companies each maintain separate shipper systems 102, 104, 106. Each of these systems 100, like the other computer systems described herein, is comprised of one or more computers or servers. As such, each system will include a set of software instructions that are stored on a non-volatile, non-transitory, computer-readable memory (such as a hard drive or flash memory device). Such memory can also store data. These programming instructions and data can be transferred to faster, more volatile memory known as RAM when in actual use by the computer system. A programmable digital processor, such as a general-purpose CPU manufactured by Intel Corporation (Mountain View, Calif.) or Advanced Micro Devices, Inc. (Sunnyvale, Calif.), accesses and executes computer programming. The computer programming typically includes operating system software such as LINUX (available from multiple companies under open source licensing terms), WINDOWS (available from Microsoft Corporation of Redmond, Wash.), or MAC OS (available from Apple, Inc. of Cupertino, Calif.).

Each system 100 maintains its own, separate application programming interface (or "API") 110 that allows third parties to interact with the system 100. In FIG. 1, shipping system 102 has its own API 112, system 104 has API 114, and system 106 has API 116. By communicating with these APIs 110, it is possible for third-party computerized systems to communicate with the shipping systems 100 of these three different shippers. These APIs 110 allow the third-party systems to request shipping cost information, to determine availability of shipping services, to determine delivery dates and times for different delivery services provided by the shipper, and to book parcel pickup and delivery services from the shippers.

Shipping aggregator 120 is a computer system that is designed to communicate with a plurality of shipper APIs 110 in order to simultaneously query multiple shipper systems 100. The aggregator 120 uses this connection to provide shipping services to additional, third-party systems such as the ecommerce systems 140 shown in FIG. 1. It is important to distinguish aggregator 120 from a comparison-shopping tool. Comparison shopping tools also link to multiple APIs 110 of shipper systems 100, but they do not provide their aggregation capabilities to third-party systems 140. Rather, they simply provide an interface (such as a web site) for user to compare shopping services and prices provided by the different systems 100. Example comparison-shopping tools (also known as "multi-shipper products") include SendPro from Pitney Bowes Inc. (Stamford, Conn.), Parcel Monkey (Southampton, United Kingdom), and ShipGooder (Mississauga, ON). These companies have products that provide rate returns to customers (either individuals or businesses), but do not provide shipping aggregation services to third party systems.

Shipping aggregator 120 is designed to provide shipping information from systems 100 to other companies for integration into the services and systems of those companies. Example shipping aggregators 120 in the marketplace include ShipHawk (Santa Barbara, Calif.), EasyPost (San Francisco, Calif.), and Shippo (San Francisco). Shipping aggregators 120 frequently refer to their product as shipping software. A shipping aggregator 120 provides an aggregator API 130 for third party products to access. E-Commerce websites 140, for instance, can access this API 130 to query multiple shipping systems 100 in order to find the fastest, most convenient, and/or cheapest shipping solutions to get their products from their warehouses to their buying customers.

Shipping aggregators 120 provide a convenient path for e-commerce websites 140 to comparison shop between the shipping services of the various shippers 100. In effect, the shipping aggregator 102 combines the APIs 110 of individual parcel carriers 100 into a single API 130. It gives the vendor behind the e-commerce website 140 access to parcel carrier rates for the shippers operating systems 102, 104, 106 (rate shopping), gives the vendor an ability to choose a carrier and print shipping labels, and provides the vendor's customers with package tracking information and shipment status updates and notifications. Furthermore, the provision of the shipping aggregator system 120 and its API 130 prevents the e-commerce system 140 from having to access the carrier APIs 112, 114, 116 individually to get the same convenience and services.

The shipping aggregator 120 must submit to each shipper's API shipping dates, ship-from and ship-to locations, and parcel specifications (size and weight). In the context of interaction with the e-commerce websites 140, this information is obtained from the product data in a purchase transaction (dimensions and weight of individual products are derived from the SKUs of the items being purchased) and from the customer information provided at checkout (the ship-to address). The ship-from address is the vendor's warehouse.

The aggregator API 130 is designed to mesh seamlessly with standard e-commerce platforms upon which e-commerce websites are built. One such e-commerce platform 140 is WooCommerce, an open-source plugin for WordPress (made available by WordPress.com of San Francisco, Calif., under the GPL license at https://woocommerce.com). WooCommerce is widely used. In 2019, it was estimated that WooCommerce was used in 22% of the top one million ecommerce websites. Shipping aggregators 120 therefore tailor their APIs 130 for use with widely used e-commerce software 140 such as WooCommerce. This integration allows the e-commerce software 140 to report orders, SKU numbers of ordered products, and customer addresses to the shipping aggregator without any significant programming. The e-commerce software 140 or the API 130 converts the SKU information concerning the products ordered into shipping size and weight information for the parcel to be shipped. This information becomes the parcel object in the context of aggregator API 130. The vendor location information becomes the "ship from" address, the customer address becomes the "ship to" information.

The aggregator system 120, its API 130, and the standard e-commerce software 140 serve to provide business-to-business cooperation between the e-commerce 140 products of one business and a shipper system 100 of another business. Unfortunately, the aggregator API 130 provides no ability for the creation of a customer-facing system that allows individual customers to ship from their own address to a selected address. While the comparison-shopping tools described above provide a customer-facing interface, these custom solutions do not provide a readily accessible API for other systems, and therefore cannot integrate into any other systems that provide additional services. This means that for individuals, or businesses with products not sold online, there isn't the ability to interface with a shipping aggregation solution, which means that there is no customer-facing online shipping 'marketplace' that provides individual or business customers an ability to ship parcel and small packages, all from one online portal.

Customer-Facing System 150

FIG. 1 shows various components that comprise a customer-facing system 150 that presents the shipping aggregation service of shipping aggregator 120 as a customer-facing tool. This is accomplished using integration programming 160 that facilitates communication between the unaltered aggregator API 130 designed for ecommerce platforms 140 and a customer-facing programming 162. Together, the integration programming 160 and the customer-facing programming 162 operate on one or more customer-facing servers that comprise system 150. These servers 150 are computer systems in the same manner as the shipper systems 100, utilizing processors, memory, and programming to provide programmed control of data, communications, and user interfaces. The custom integration programming 160 can operate on the same physical computer/machine as the customer-facing programming 162. Alternatively, they can each operate on their own separate machine, or a plurality of server computing devices can operate cooperatively as system 150 to run programming 160, 162.

One embodiment of the customer-facing programming 162 provides an online shipping marketplace for parcels and small packages. The customer-facing programing 162 uses the integration programming 160 to interact with the aggregator API 130 so that individual customers can take advantage of the aggregation services of shipping aggregator 120. Customers 170 interact with this programming 162 over network 172, which may take the form of a wide-area network such as the Internet 172.

The customer-facing programming 162 allows users 170 to directly shop for and purchase a 'shipping service' much like they would purchase a physical product at standard e-commerce websites. The customer-facing programming 162 uses the customer integration programming 160 to access the aggregator API 130, which allows its customers to compare different shipping services, to select and arrange shipment, and to pay for the service through standard checkout capabilities.

In one embodiment, the customer-facing programming 162 is a standard e-commerce platform that communicates with the aggregator API 130 only through the custom integration programming 160. In this embodiment, this customer-facing programming 162 could even take the form of the WooCommerce platform described above as an example software platform for the e-commerce servers 140. WooCommerce (or another e-commerce platform) can be used to generate the customer-facing programming 162. A customer 170 can access this programming 162 through network 172 and rate shop parcel carriers worldwide, book their shipments, print labels, track packages and receive status updates and notifications.

As explained above, however, standard e-commerce platforms interact with the aggregator API 130 in standard, fixed methods. For the customer-facing programming 162 to use a standard e-commerce platform, the system 150 must provide customer integration programming 160 to operate as a go-between between the customer-facing programming 162 and the aggregator API 130. In particular, the ecommerce platform 162 must present to the customer integration programming 160 data inputted directly by the customer, including the ship-from and ship-to addresses as well as the package dimension and weight information. The aggregator API 130 is not designed to receive customer-selected ship-from locations, nor is the aggregator API 130 designed to accept dimensions and weight inputted by the customer. As explained above, the API 130 will generally use the vendor warehouse locations for all shipping requests, and base the parcel dimensions and weight on the SKUs provided by the customer. In the embodiment of FIG. 1, it is up to the custom integration programming 160 to accept customer-inputted data items and conform them to the expected input of the aggregator API 130.

In the specific context of WooCommerce being selected as the customer-facing programming 162 and Shippo being selected as the shipping aggregator 120, the customer-facing programming 162 will not pass a "from_address" parameter. This is because the aggregator API 130 was never designed to accept a ship-from address based on customer input. Rather, the aggregator API 130 provides each vendor with a setup dashboard in which the ship-from address is set for all customers of that vendor. The vendor is able to specify this ship-from address, but the API 130 is incapable of receiving this address through any type of input from a customer interface. Because of this limitation, the custom integration program 160 must populate the from-address field programmatically based on input made by the customer 170. This data is then passed directly into the "Shipment" object required by the aggregator API 130. This is accomplished using the "/addresses" endpoint. Before Shipment creation, the custom integration programming 160 captures the "order.to_address.object_id" values and the object_id value of a newly created address from the "/addresses" endpoint (signifying the "from_address"). These data items are input by the customer 170 interacting with the customer-facing system 150. At this point, the custom integration programming 160 passes the customer input data-object_ids in the "address_to" and "address_from" fields of the Shipment object (along with the weight and dimensions of what's being shipped) for rate calculation by the aggregator API 130. In one example, these addresses are specified in a format such as:

1) "from_address": "c179cc97f15b4329925b8900a5830faa" [from the "/addresses" endpoint]
2) "to_address": "5bdf91baa1e04d71accef9b05fac4492" [from order.to_address.object_id]

Locker System 200

It is well known that the most inefficient portions of almost any shipment is the first and last mile of the journey. The last mile in logistics is the least efficient, accounting for up to 30% of shipping costs. These "last mile inefficiencies" are pain points for shippers, carriers, and customers alike. In urban areas, safety and congestion challenge shippers in meeting delivery schedules. Suburban sprawl and rural areas are inefficient for lack of universal drop points or delivery hubs. For multi-family residential housing, management companies must spend time on package handling, while tenants deal with the hassles of limited pickup hours. For single family housing, package theft and missed deliveries effect the pocketbook of residents and the bottom line for carriers with multiple redelivery attempts. There are no publicly accessible, conveniently placed shipping centers that provide neighborhood residents an alternate ship-from or ship-to address along with universal carrier pick-up and drop-off privileges. The system 200 of FIG. 2 attempts to overcome some of these issues through the introduction of an intelligent physical locker system 210 to an overall delivery system 200.

Figure 2:
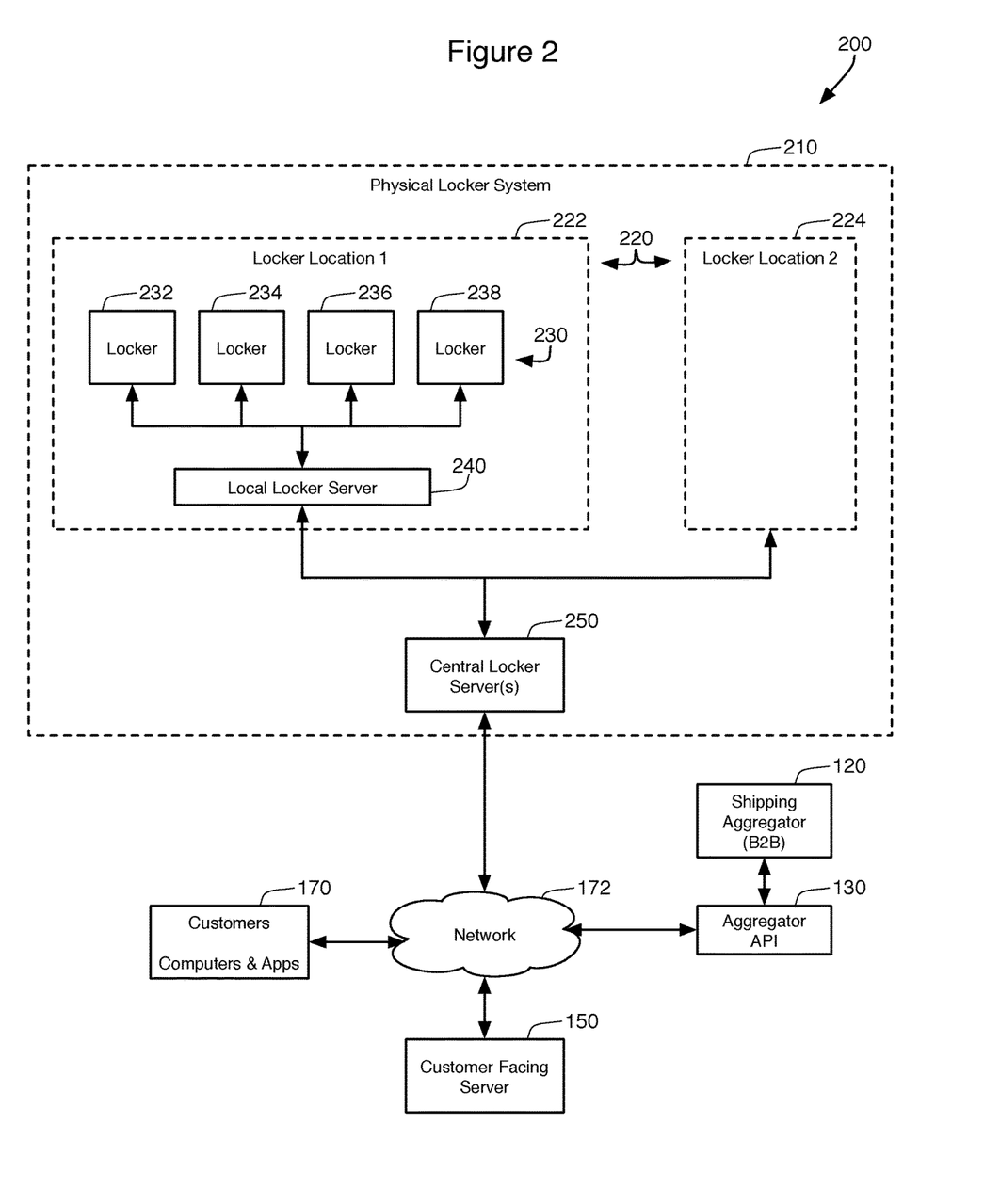
FIG. 2 is a schematic view showing the details of a physical locker system that can be integrated into the system of FIG. 1.

While other locker systems exist, these systems are primarily operated by a single shipper. For instance, the USPS operates post office boxes, which function as a ship-to locker. The locker system 210 described herein is carrier agnostic, meaning that any shipper associated with shipper systems 102, 104, and 106 are able to utilize the locker system 210 as both a ship-to and a ship-from location. The creation and communications of PINs as described herein allow this carrier agnostic capability.

The locker system 210 is a network of automated, self-service shipping and storage locations or stations 220 (such as locker locations 222 and 224). Each of these stations 220 is a mini ship to, ship from and storage hub that accepts packages from all parcel carriers that service their locations. Inside each location 220 is a plurality of lockers 230, such as lockers 232, 234, 236, and 238 that are shown in FIG. 2 inside locker location 222.

These lockers 230 can be considered intelligent drop boxes designed to replace the dated mailboxes usually used for deliveries to single family residences. The lockers 230 are "intelligent" because they include the ability to create and customize locker combinations (or PINs) for opening and locking the locker 230, and because they contain sensors that communicate their status to a local computer or server 240. For example, electronics can monitor attempts to open a locker 230, with multiple failed attempts being communicated to the local server 240 to prevent further attempts during a cool-down period. Furthermore, the sensors can determine when a locker 230 was opened, when it was closed, and when a particular locker is empty. The sensors used in the locker 230 are well-known, and can take the place of touchpads (for receiving combinations from users and registering failed attempts to unlock the locker 230), physical switches (for determining the open/close state of the locker 230), and optical or weight sensors (to determine whether or not the locker 230 is empty).

In the preferred embodiment, the stations 220 are universal locations that are useable with a variety of shipping companies (such as USPS, UPS, and FedEx). These stations or locations 220 would preferably offer extended hours for package drop off and collection access, provide neighborhood residents and the business community with alternative addresses for shipping, and provide shippers and carriers with a network of mini distribution hubs for improved last mile efficiencies. By using this type of locker system 210 for package pickups and drop offs, truckers can decrease deadhead miles by centralizing deliveries and pick-ups. Small retailers can use these locations 220 as automated, self-service collection terminals to meet demands created by increased e-commerce sales.

As shown in FIG. 2, the individual lockers 230 are in communication with a local locker server 240. This server 240 can take the form of a standard computer system with a processor, memory, and programming, as explained above. The local locker server 240 communicates with the sensors, locks, codes, and other electronic elements on the individual lockers 230. In the preferred embodiment, the lockers 230 are opened by PIN code access, meaning that a user can open a locker by pressing the correct series of numbers on a number pad. The number pad can take the form of a touch pad or a pad comprising a plurality of physical buttons. In other embodiments, the number pad takes the form of a keypad on a user's mobile device touchscreen, which in turn is connected wirelessly with the local locker server 240 though an app operating on the mobile device. The PIN or PINs that open each locker will change for each new customer that reserves that physical locker. In some instances, the PINs are randomly generated for each new locker rental. In other instances, the customer is allowed to select their own PIN or PINs. It is the local locker server 240 that is responsible for managing these PINs. In some embodiments, the lockers themselves are responsible for verifying correct PIN entry before opening their locks, with the server 240 merely updating their stored PIN data. In other embodiments, all entries on the number pads of the lockers 230 are sent to the local locker server 240 for verification, with the local locker server 240 responsible for unlocking any individual locker 230. In some embodiments, each local locker 230 has a separate number pad, while in other embodiments a bank of lockers 230 might share a keypad.

It is contemplated that when a user reserves a locker, at least two different PINs will be provided. If the locker is provided as a ship-to location, the customer will be provided with a delivery or drop-off PIN and a pickup PIN. The drop-off PIN can be provided by the customer to the shipping company. The shipper employee will be instructed to deliver a package to the physical address of the locker location 220. Once there, the delivery instructions may include a specific locker number, with the drop-off PIN to open the locker being included in the special delivery instructions provided to the employee. The shipper employee will approach the locker and enter that PIN. If the PIN matches the known drop-off PIN, the locker will open, the employee can insert the package into the locker, and the door to the locker will be closed and relocked. If no specific locker number is provided in the delivery instructions, the PIN can be sufficiently unique that the shipper employee merely enters a PIN at a central spot within the locker location 220, and the locker number will be identified and the locker unlocked.

When the customer 170 arrives to pick up their package, they can approach the locker and type in the pick-up PIN. In other embodiments, the customer 170 will have an app on a mobile device that is associated with the locker system 210 or the customer-facing system 150. Information about the customer's assigned locker can be stored in the app when the customer reserves the locker. Rather than typing in the pick-up PIN, the customer 170 might simply approach the locker. Bluetooth or near field communication (NFC) communications between the customer's mobile device and the locker will automatically communicate unlocking information and the locker will unlock automatically. Alternatively, the mobile device app might generate a QR code that could be read at the locker location 222 to unlock the appropriate locker. In this manner, an embodiment can be implemented in which a customer 170 accesses a locker 230 via an app operating on the customer's mobile phone, while shipper employee accesses the same locker via a physical keypad using PIN numbers identified in the shipping documentation.

Using the locker system for a ship-from location is similar, with the customer 170 approaching the locker 230 in the locker location 220 with their package. The locker 230 is unlocked, the package is placed in the locker 230 by the customer 170, and the door is closed. The shipper employee arrives to pick up the package for shipping. The pick-up PIN is in the shipping special instructions and is used to unlock the locker. The shipper employee removes the package and closes the locker door.

Note that sensors inside each locker can determine whether or not the locker is empty. An optical beam might, for instance, periodically traverse the locker. If the beam is interrupted, the locker is not empty. The empty status of each locker 230 can be tracked by the locker system 210. If the empty status is different than what would be expected, an error can be triggered. The error may initiate communication to the customer informing them of the error, or to service staff. Such an error might occur, for instance, when a drop-off code is used to drop off a package, but the locker remains empty even after the locker door is reclosed. Alternatively, an error might occur when a pick-up code is used to unlock a locker, but the locker remains in use (not empty) even after the locker door is closed.

In the preferred embodiment, each locker location 220 has its own local locker server 240. These servers 240 communicate with a central locker server or servers 250. These computing systems 250 are responsible for tracking the status of all of the locker locations 220 and all of the lockers 230 at each location. It is the central server 250 that communicates with other elements of the system 200. For instance, when a customer 170 searches for an available locker 230, reserves the locker 230, and pays for the reservation, this will occur over network 172 through an interface (such as a web page) provided by the central locker server 250. Similarly, to the extent that the locker system 210 is integrated into the customer-facing system 150 of FIG. 1, it is the central server 250 that will communicate with the customer-facing servers 150 to allow that integration.

The overall locker system 210 is shown in FIG. 1 as providing a flexible, carrier-agnostic delivery location for the customer-facing aggregation system 150. In another embodiment, a retailer or other business can serve as a carrier-agnostic delivery location. A user can select the address of a cooperating business as a ship-to or ship-from address. Codes similar to the PINs described above are used during drop-off and pick-up at the business. The drop-off PIN can serve to identify the item being dropped off, which the business can do using an app or website tied to the overall system 10. The PIN can be shared verbally, by using a keypad, or by using an app in the same manner as described above. During pickup, the pick-up PIN can be used to verify the identity of the person picking up the package as well as identifying the package to be handed over by the business. Cooperating businesses can receive a fee taken from the overall shipping costs as compensation for their role.

Customer-Facing Shipping API

As explained above, if the customer-facing program 162 is to take the form of a standard e-commerce platform such as WooCommerce, the program 162 cannot communicate the ship-from and ship-to addresses to the shipping aggregator 120 without the custom integration programming 160. In FIG. 1, the customer-facing program 162 was designed to form part of a single system 150 with the customer integration program 160. In fact, both program elements 160, 162 could be operated on the same computer system 150. However, it is also possible to use the custom integration programming 160 on its own to provide an interface for third-party systems.

Figure 3:
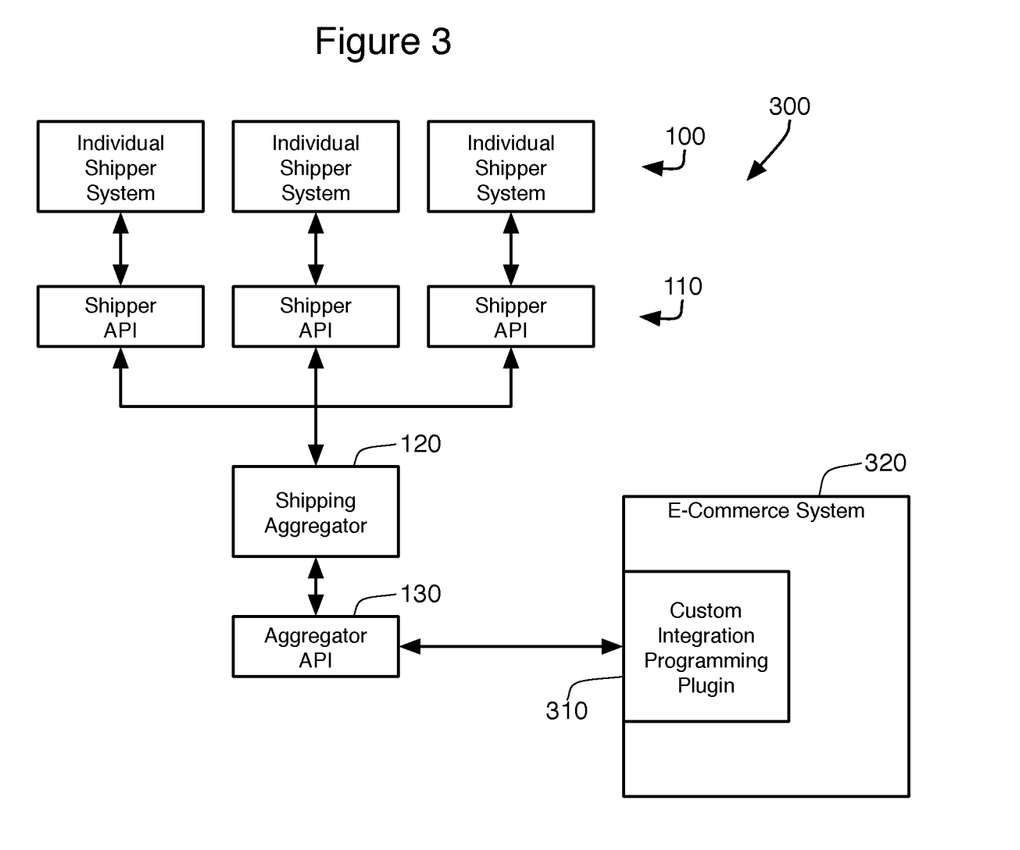
FIG. 3 is a schematic view of customer integration programming in the form of plugin code.

In FIG. 3, the customer integration programming 160 takes the form of a plugin 310. The plugin 310 is used by a standard e-commerce system (such as WooCommerce) 320. This plugin allows the e-commerce system 320 to create services for purchase that are identified by the shipping aggregator 120 through the aggregator's standard API 130. As was the case with the customer-facing system 150, the e-commerce system 320 now allows shipping services to be selected from multiple shipper systems 100 using the standard shipper APIs. These shipping services can be analyzed, rate compared, and selected using the standard aggregator API 130. And the e-commerce system 320 will treat these shipping services as standard items that can be purchased and paid for like any other item handled by the e-commerce system 320.

The plugin 310, like all software plugins, technically provides an API that is used by the e-commerce system 320. The plugin 310 is able to communicate to the e-commerce system 320, and vice versa, through this API. In this case, the plugin is effectively a customer-facing shipping API. It takes the shipping aggregator API 130 that is usable only for business-to-business transactions (where the retailer is purchasing the shipping services and the ship from address is pre-defined by the retailer) and turns it into a customer-focused API where end-user customers are able to compare and select among shipping services. The e-commerce system 320 can be programmed to allow the customer to ship anything from anywhere to anywhere, or it can be a more traditional e-commerce system 320 that is primarily concerned with shipping purchased products to customer. Although this latter option sound much like the standard e-commerce system 140 that use the traditional aggregator API 130 directly (as shown in FIG. 1), the customer-facingshipping API 310 allows the customer to select from multiple shipping options and to include the shipping service as an item in their purchase order.

Customer-Facing Shipping Aggregation Method 400

Figure 4:
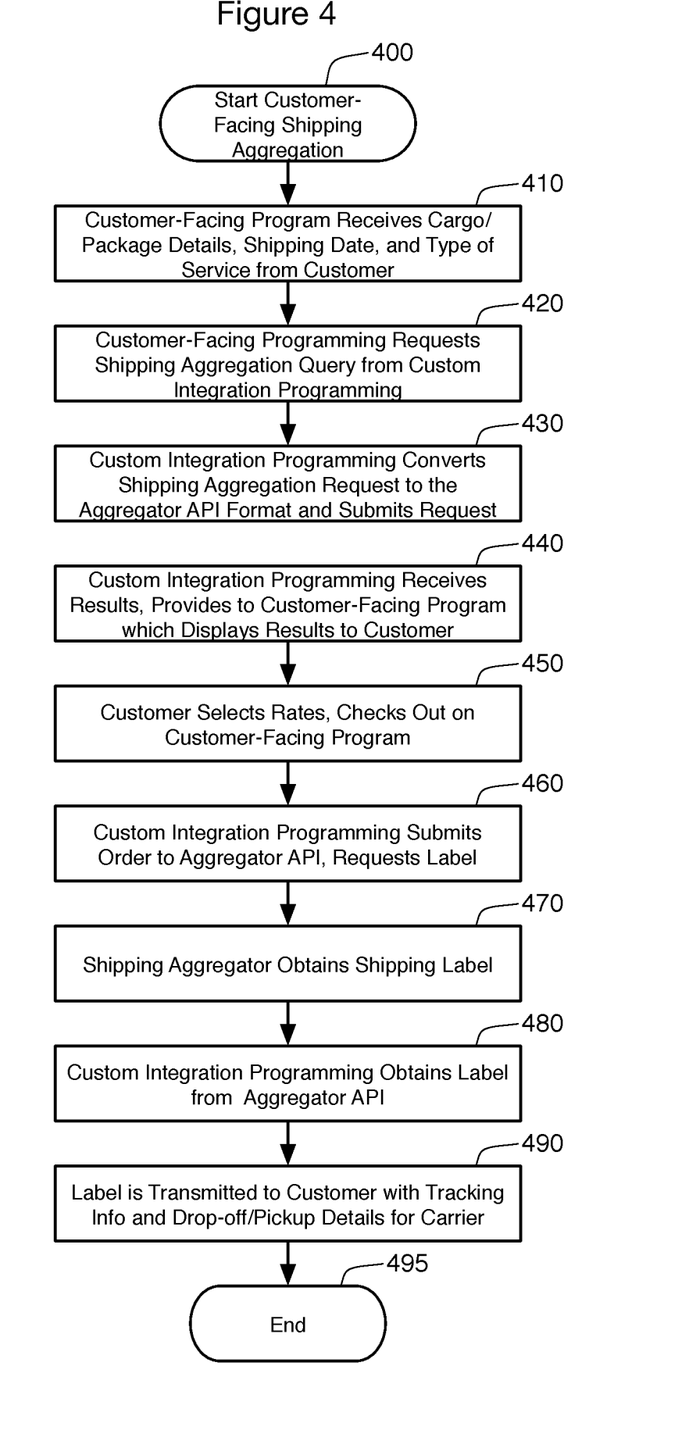
FIG. 4 is a flow chart showing a process of facilitating communications using the elements of FIG. 1.

FIG. 4 shows a method 400 for using the customer-facing shipping system 150 from FIG. 1. The first step 410 in this method is for the customer 170 to enter order information onto the standard customer-facing programming (such as WooCommerce) 162. This order information relates to a request to ship a package or item. The order information will include a ship-from and ship-to address. In addition, information about the package will be collected by programming 162, including the package dimensions, the package weight, and a description. It is also possible for the customer 170 to select a type of service, such a fast or inexpensive parcel delivery. The customer 170 can elect not to select any type of service, allowing the system 150 to determine the rate for all types of shipping services.

The customer-facing programming 162 would like to use this information to request shipping options from aggregator 120, but the aggregator's API 130 cannot accept this information directly. Instead, at step 420, the customer-facing programming 162 requests that the custom integration programming 160 prepare and execute this query request at step 420. The custom integration programming 160 converts the information it receives from the customer-facing programming 162 into a request that can be handled by the aggregator API 130 at step 430. The custom integration programming 160 accomplishes this by sending a web hook request to API 130. This request will identify the address identified by the customer as the "Ship From Address" used by the aggregator 120 for multiple carrier rate generation. The custom integration programming 160 then receives the results of the query from the shipping aggregator 120 at step 440 and provides this information to the customer-facing programming 162. The customer-facing programming 162 then presents this data through its user interface for customer viewing and selection. This result data includes shipping rate quotes that the shipping aggregator 120 received by querying the various individual shipping systems 100 that form part of system 10.

At this point, the customer 170 uses the user interface of the customer-facing programming 162 to select a rate and shipper, and to then check out and pay for the desired shipping service. This occurs at step 450. The rates provided to the customer will likely include an additional fee to pay for the aggregation service provided by the operator of the customer-facing system 150.

At step 460, the custom integration programming 162 submits the customer's chosen carrier and rate info back to the shipping aggregator 120 through aggregator API 130 and the custom integration programming 160. This allows the shipping aggregator 120 to handle the label generation for the shipping and to create all necessary tracking information (step 470). The shipping aggregator 120 can generate the label and information itself, or it can request this from the selected shipping systems 100. The custom integration programming 160 then receives the label and tracking information from the aggregator API 130 and presents it to the customer-facing programming 162 at step 480. The customer 170 is then presented with the label and tracking information through the user interface of the customer-facing programming 162 at step 490. In some embodiments, the customer-facing programming 162 and the customer integration programming 160 will simply request that the shipping aggregator 120 send the label and tracking information direction to the customer such as via email. Package drop off or pickup details for the selected carrier can also be communicated to the customer 170 at step 490. The method 400 then ends at step 495, Locker Reservation Method 500

Figure 5:
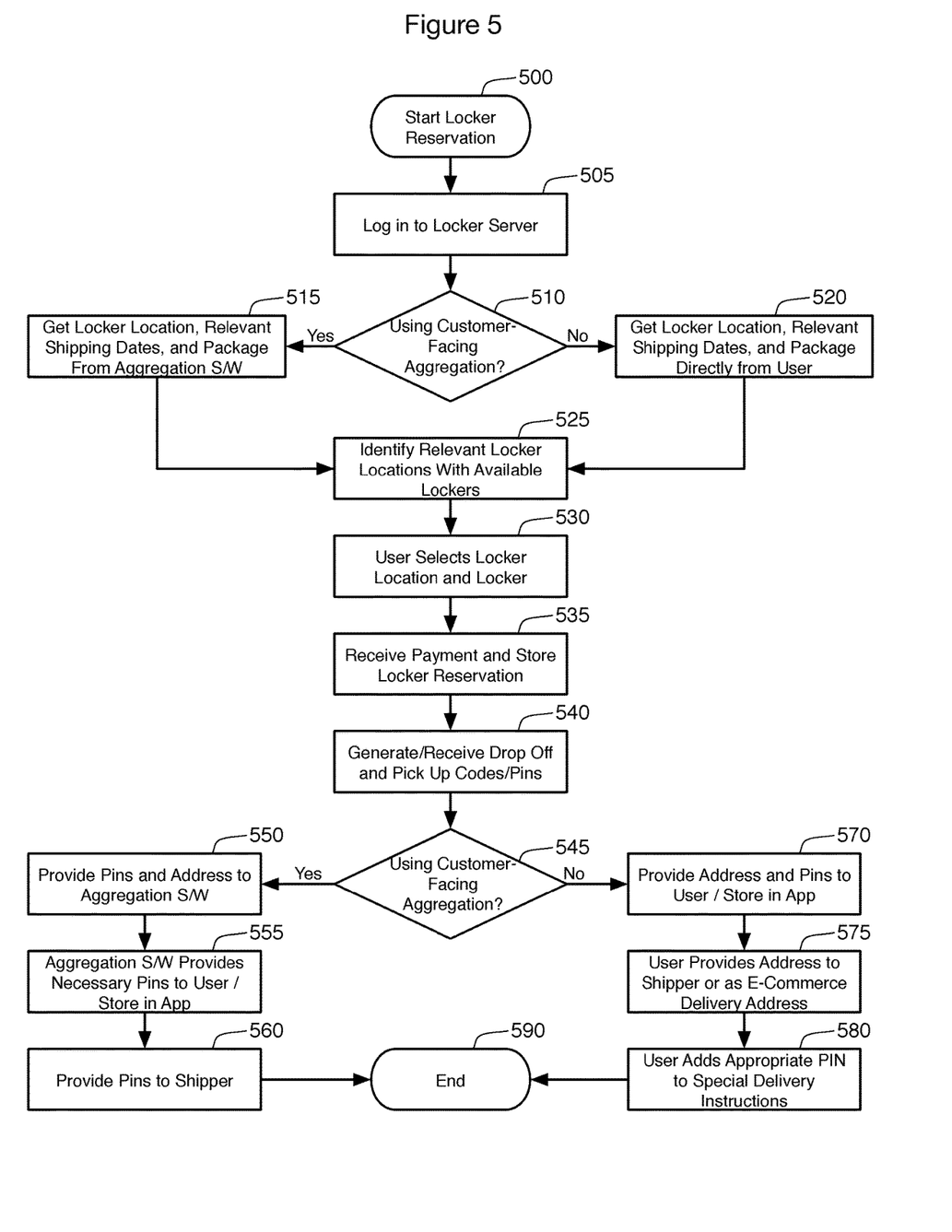
FIG. 5 is a flow chart showing a process of reserving in the physical locker system of FIG. 2.
Figure 6:
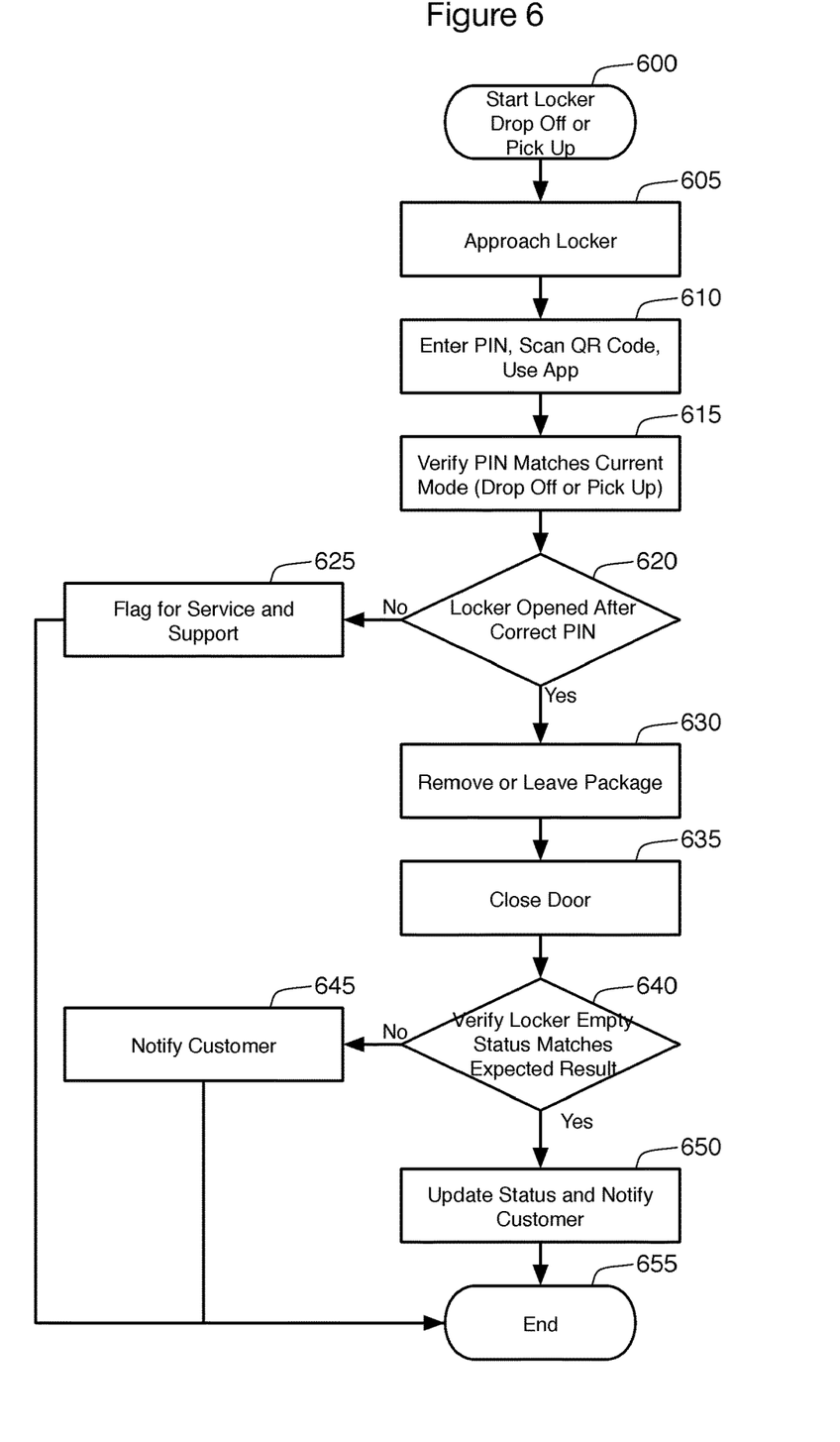
FIG. 6 is a flow chart showing a process of utilization in the physical locker system of FIG. 2.

As shown in FIG. 1, the programming on the customer-facing server 150 comprises the customer-facing programming 162 and the custom integration programming 160. These elements alone are sufficient to preform method 400. But the integration of locker system 210 further improves the function and efficiency of the overall system. FIGS. 5 and 6 show methods 500 and 600, respectively, that can be used in the locker system 200 of FIG. 2.

Method 500 provides for the reservation of a locker 230. The method 500 starts at step 505, in which a customer logs into the central locker server 250. If the user has not previously used the physical locker system 210, then this step 505 will include the creation of a new user account.

At step 510, it is determined whether the use of the locker system 210 is part of the overall use of the customer-facing aggregation system 150 or not. If it is, the user has already used the customer-facing programming 162 to begin the process of selecting and purchasing shipping services. As a result, the system 150 will already know information about the customer's desires, such as the preferred location for the locker (based on the ship-from and/or ship-to information provided by the customer), the shipping dates, and the package size. This information is acquired from the other portions of the customer-facing system 150 at step 515. If the customer is using the locker system 210 outside of the customer-facing system 150, then it will be necessary to obtain this information direction from the customer. This occurs when the central server 250 requests and obtains this information in step 520.

At step 525, the locker system 210 searches the desired location(s) of the users for nearby locker locations 220 and determines which locations 220 have available lockers 230. Available lockers 230 are those lockers that are both available for the desired times and can accommodate the package size. This occurs at step 525. Assuming multiple lockers 230 and locker locations 220 are identified, these options are presented to the user. The user then selects a particular locker 230 and location 220 at step 530. The central locker server 250 then accepts payment from the user (or integrates the payment into the transaction being handled by the customer-facing programming 162) at step 535. At this point, information about the reservation is then stored at the central locker server 250. In some embodiments, this reservation information is also communicated to the local locker server 240 at the selected location 220.

At step 540, the locker system 210 will generate drop-off and pick-up PINs that will serve to open the selected locker 230. As explained above, while PINs will generally be made available due to the ease of implement and PIN-based system and the ease of sharing PINs with shipping employees, the system 210 is also capable of providing unlock information directly to an app of a customer, thereby allowing the customer to use the app to open their locker rather than entering a PIN. As is also explained above, some embodiments allow users to select their own PINs.

At step 545, the method 500 again determines whether use of the system 210 is part of the overall customer-facing aggregation system 150. If so, the PINs and delivery address information are provided directly to the customer-facing aggregation servers at step 550. This allows the address information of the locker locations 220 to be used with any queries of the shipping aggregator 120. The PIN information is also stored and presented to the customer 170 through programming 162 in step 555. Finally, the customer-facing aggregation server 162 can ensure that the appropriate PINs are automatically incorporated in the delivery or pickup special instructions that are provided to the selected shipper 100 at step 560.

If step 545 determines that the user is not using the customer-facing aggregation system 150, the central server 250 will provide the PINs and the locker address(es) to the user at step 570. If the user is using an app associated with the locker system 210 (or the aggregation system 150), this information is also stored in the app. The user can then use the address of the locker location 220 when specifying shipping information to a third party. For instance, the user may reserve a locker through method 500, and then go to an unrelated e-commerce system to purchase an item for delivery. The address of the locker system will be used in step 575 as the delivery address during checkout at the unrelated e-commerce system. The user will also add the appropriate drop-off PIN number to the special delivery instructions that are requested during this check-out at step 580. At this point, following either step 560 or 580, the method 500 ends at step 590.

Locker Use Method 600

Method 600 on FIG. 6 shows how the physical lockers 230 are put to use after they are reserved in method 500. The method 600 begins with a user or a shipper employee approaching the locker 605. For this to occur, the address of the locker location 220 must have been provided. In most cases, a locker number is also provided, although, as explained above, it is possible that the locker number is not provided until a PIN is entered at a central keypad at the locker location 220.

When the locker is approached, it is unlocked by entering the appropriate PIN at step 610. The shipper employee will have the PIN in their special instructions for delivery (or pick-up, as the case may be). The customer 170 will have received their PIN through the reservation process 500. As explained above, the customer 170 may also be able to unlock the locker through the use of wireless interaction (Bluetooth or NFC) between an app on their phone and the locker, or through the display and reading of a QR code.

At step 615, the locker 230 or the local locker server 240 will verify the PIN. In many cases, separate PINs will be provided for drop-off and pick-up. Consequently, this step 615 will verify that the entered PIN matches the current condition or mode of the locker 230. If a package has already been dropped off inside the locker 230, then the drop-off code would generally not be reusable to re-open the locker. Exceptions can be made within a certain time period, thereby allowing the door of the locker to be opened multiple times within that time period for the dropping off or picking-up of multiple packages.

At step 620, assuming that the correct PIN is entered, the system 210 will confirm that the locker did indeed open. If not, the locker itself is probably faulty, which means that the locker should be flagged for service and support at step 625. If this were a drop-off action, it may be possible to substitute a different locker. If so, the customer 170 or shipper employee would be directed to a different locker 230 at the same location 220 that is functioning properly. If this occurs, then the pick-up locker identification would also need to be switched. If the locker numbers are not provided to either party until their arrival at the locker location 220, this will not cause any issue. When someone comes to pick-up the package, they will be directed to the new locker 230 by the local locker server 250 as part of the standard procedure of entering the PIN into the central keypad. If locker numbers are pre-identified and provided to the customer/shipper employee, the new locker location will be communicated when that person attempts to use the pick-up PIN to pick-up the package at the malfunctioning locker. A display on or near the locker will explain the situation and identify the correct locker. If a customer 170 using an app is picking up a parcel, the app would be notified of the new locker number at the time of the switch.

Assuming that the locker did open (as confirmed by step 620), the user or shipping employee is then free to either remove or drop off a package in the locker at 630. After they have done so, they will then close the door at step 635. Method 600 then examines the content of the locker 230 such as by using an interior sensor. This is done to ensure the empty status of the locker 230 matches the expected result. If, for instance, a drop-off PIN was just entered, the locker 230 should contain a package. If there is a mismatch identified at step 640, then the customer 170 is notified at step 645 of this mismatch. Otherwise, if all is as expected, the status of the locker 230 is updated at the central locker server 250, and the customer is notified at step 650. In this way, the customer will be notified if the shipper has dropped off their package at the locker 230, or if the shipper has picked up a package from the locker 230 for shipping elsewhere. The method 600 then ends at step 655.

The many features and advantages of the invention are apparent from the above description. Numerous modifications and variations will readily occur to those skilled in the art. Since such modifications are possible, the invention is not to be limited to the exact construction and operation illustrated and described. Rather, the present invention should be limited only by the following claims.

What is claimed is:

1. A system comprising:
   a) a plurality of shipper computer systems, each shipper computer system belonging to a shipping company providing shipping services, wherein each of the plurality of shipper computer system are configured to receive shipper queries and provide rate information on their respective shipping services;
   b) a shipping aggregator computer system that receives aggregation queries in a B2B format from a plurality of e-commerce platforms through an aggregator application programming interface and, for each received aggregation query, converts the received aggregation queries into related shipper queries and submits related shipper queries to all of the plurality of shipper computer systems, the shipping aggregator computer system further aggregating the rate information on the shipping services provided by the shipping companies into aggregated received rate information, wherein the shipping aggregator computer system; and
   c) a customer-facing computer system comprising:
      i) customer-facing programming that:
         (A) creates a user interface for a customer;
         (B) determines a ship-from address from the customer based on location information entered into the user interface;
         (C) receives a ship-to address from the customer via direct entry in the user interface; and
         (D) receives parcel information including dimensions and weight from the customer via direct entry in the user interface;
      ii) integration programming that:
         (A) receives from the customer-facing programming the ship-from address, the ship-to address, and the parcel information;

(B) translates the ship-from address, the ship-to address, and the parcel information into a B2B formatted customer query;
(C) submits the B2B formatted customer query to the aggregator application programming interface; and
(D) receives, from the aggregator application programming interface, the aggregated received rate information; and
iii) where the customer-facing computer system further:
(A) presents the aggregated received rate information to the user interface;
(B) receives from the user interface a selection of a selected rate and a selected shipper; and
(C) submits the selected rate and the selected shipper to the aggregator application programming interface.

2. The system of claim 1, wherein the customer-facing computer system further obtains a shipping label from the aggregator application programming interface.

3. The system of claim 2, wherein tracking information carrier interaction details, and the shipping label are transmitted to the customer by the customer-facing computer system.

4. The system of claim 1, wherein the shipping aggregator computer system transmits a shipping label directly to the customer through contact information provided by the customer-facing computer system.

5. The system of claim 1, wherein the ship-from address is directly input into the user interface by the customer.

6. The system of claim 1, further comprising:
d) a central locker computer system that:
i) receives from the customer-facing computer system the location information and parcel information,
ii) searches data for a locker location near the location information and a locker at the locker location that is sufficient to handle a parcel identified by the parcel information, and
iii) returns to the customer-facing computer system the locker location.

7. The system of claim 6, wherein the customer-facing programming determines the ship-to address based on the locker location, wherein the central locker computer system determines a drop-off PIN and a pick-up PIN and communicates the PINs to the customer-facing computer system; further wherein the drop-off PIN is submitted by the customer-facing computer system as special instructions along with the submitted selected rate and selected shipper.

8. The system of claim 6, wherein the customer-facing programming determines the ship-from address based on the locker location, wherein the central locker computer system determines a drop-off PIN and a pick-up PIN and communicates the PINs to the customer-facing computer system; further wherein the pick-up PIN is submitted by the customer-facing computer system as special instructions along with the submitted selected rate and selected shipper.

9. A method comprising:
a) creating, at a customer-facing computer system, a user interface for a customer;
b) determining, at the customer-facing computer system, a ship-from address from the customer based on location information entered into the user interface;
c) receiving, at the customer-facing computer system, a ship-to address from the customer via direct entry in the user interface;
d) receiving, at the customer-facing computer system, parcel information including dimensions and weight from the customer via direct entry in the user interface;
e) translating, at the customer-facing computer system, the ship-from address, the ship-to address, and the parcel information into a customer query formatted in a B2B format, wherein the B2B format is used by an aggregator application programming interface to receive aggregation queries from e-commerce platforms for submission to an aggregator computer system;
f) transmitting, at the customer-facing computer system, the customer query to the aggregator computer system via the aggregator application programming interface,
g) submitting, at the aggregator computer system, shipper queries to a plurality of shipping computer systems, the shipper queries being related to the customer query;
h) aggregating, at the aggregator computer system, received rate information on shipping services from the plurality of shipping computer systems into aggregated received rate information;
i) receiving, at the customer-facing computer system through the aggregator application programming interface, the aggregated received rate information from the plurality of shipping computer systems;
j) presenting, at the customer-facing computer system, the aggregated received rate information on the user interface;
k) receiving, at the customer-facing computer system and from the user interface, a selection of a selected rate and a selected shipper; and
l) submitting, at the customer-facing computer system, the selected rate and the selected shipper to the aggregator application programming interface.

10. The method of claim 9, further comprising:
m) receiving, at the customer-facing computer system and from the aggregator application programming interface, a shipping label; and
n) transmitting, from the customer-facing computer system, the shipping label, tracking information, and carrier interaction details to the customer.

11. The method of claim 9, further comprising:
m) transmitting, at the aggregator computer system, a shipping label directly to the customer through contact information provided by the customer-facing computer system.

12. The method of claim 9, wherein the ship-from address is directly input into the user interface by the customer.

13. The method of claim 9, further comprising:
m) receiving, at a central locker server and from the customer-facing computer system, the location information and the parcel information,
n) searching, at the central locker server, data for a locker location near the location information and a locker at the locker location that is sufficient to handle a parcel identified by the parcel information, and
o) transmitting, at the central locker server and to the customer-facing computer system, the locker location;
wherein the customer-facing computer system determines the ship-from address based on the locker location.

14. The method of claim 13, further comprising:
p) determining, at the central locker server, a drop-off PIN and a pick-up PIN; and
q) communicating, at the central locker server and to the customer-facing computer system, the drop-off PIN and the pick-up PIN;

wherein the customer-facing computer system determines the ship-to address based on the locker location, and wherein the drop-off PIN is included by the customer-facing computer system with the submitted selected rate and the selected shipper.

15. The method of claim 13, further comprising:
p) determining, at the central locker server, a drop-off PIN and a pick-up PIN; and
q) communicating, at the central locker server and to the customer-facing computer system, the drop-off PIN and the pick-up PIN;
wherein the customer-facing computer system determines the ship-from address based on the locker location, and wherein the pick-up PIN is included with the submitted selected rate and the selected shipper.

16. A method comprising:
a) providing a software plugin in communication with an e-commerce system, wherein the e-commerce system sells goods to a customer through a system customer-facing user interface provided by the e-commerce system;
b) providing, through the software plugin, a plugin user interface usable by the e-commerce system;
c) determining, at the software plugin, a ship-from address, a ship-to address, and parcel information including dimensions and weight;
d) translating, at the software plugin, the ship-from address, the ship-to address, and the parcel information into a customer query in a B2B format, wherein the B2B format is used by an aggregator application programming interface to receive aggregation queries from other e-commerce platforms for submission to an aggregator computer system;
e) transmitting, at the software plugin, the customer query to the aggregator computer system via the aggregator application programming interface;
f) receiving, at the software plugin and through the aggregator application programming interface, aggregated received rate information, wherein the aggregated received rate information was generated by the aggregator computer system by submitting shipper queries to a plurality of shipping computer systems related to the customer query and aggregating received rate information relating to multiple shippers from the plurality of shipping computer systems;
g) presenting, through the plugin user interface, the aggregated received rate information on the plugin user interface;
h) receiving, from the plugin user interface, a selection of a selected rate and a selected shipper from the multiple shippers;
i) presenting, from the software plugin and to the e-commerce system, the selection of the selected rate and the selected shipper as an item to be purchased through the e-commerce system, and
j) submitting, from the software plugin, the selected rate and the selected shipper to the aggregator application programming interface.

17. The method of claim 16, wherein the ship-from address, the ship-to address, and the parcel information are input by the customer through the plugin user interface.

18. The method of claim 16, further comprising:
k) receiving, at a central locker server and from the software plugin, the parcel information,
l) searching, at the central locker server, data for a locker at a locker location that is sufficient to handle a parcel identified by the parcel information, and
m) transmitting, at the central locker server and to the software plugin, the locker location;
wherein the software plugin determines the ship-from address based on the locker location.

19. The method of claim 18, further comprising:
n) determining, at the central locker server, a drop-off PIN and a pick-up PIN; and
o) communicating, at the central locker server and to the software plugin, the drop-off PIN and the pick-up PIN;
wherein the pick-up PIN is included by the software plugin with the selected rate and the selected shipper when submitting to the aggregator application programming interface.

20. The method of claim 16, wherein the ship-from address and the parcel information are provided to the software plugin from the e-commerce system.

* * * * *